United States Patent [19]
Collins et al.

[11] Patent Number: 5,664,395
[45] Date of Patent: Sep. 9, 1997

[54] THERMALLY INSULATING GLASS PANELS

[75] Inventors: Richard Edward Collins, Riverstone; Jian Zheng Tang, Merrylands, both of Australia

[73] Assignee: The University of Sydney, Sydney, Australia

[21] Appl. No.: 256,960

[22] PCT Filed: Jan. 29, 1993

[86] PCT No.: PCT/AU93/00040

§ 371 Date: Jul. 28, 1994

§ 102(e) Date: Jul. 28, 1994

[87] PCT Pub. No.: WO93/15296

PCT Pub. Date: Aug. 5, 1993

[30] Foreign Application Priority Data

Jan. 31, 1992 [AU] Australia ................ PL0720

[51] Int. Cl.⁶ ................ E06B 3/66; C03C 27/00
[52] U.S. Cl. ................ 52/786.13; 156/109; 428/34
[58] Field of Search ................ 52/786.1, 786.13, 52/171.3, 172; 428/34; 156/99, 104, 107, 109

[56] References Cited

U.S. PATENT DOCUMENTS

| | | | |
|---|---|---|---|
| 2,303,897 | 12/1942 | Smith | 52/172 |
| 2,749,579 | 6/1956 | Shaw | 52/204.52 |
| 3,914,000 | 10/1975 | Beckerman et al. | 65/34 |
| 3,990,201 | 11/1976 | Falbel | 52/171.3 |
| 4,683,154 | 7/1987 | Benson et al. | |
| 4,786,344 | 11/1988 | Beuther | 156/109 |
| 5,124,185 | 6/1992 | Kerr et al. | 428/34 |

FOREIGN PATENT DOCUMENTS

| | | |
|---|---|---|
| 6036865 | 12/1966 | Australia. |
| 1661867 | 7/1969 | Australia. |
| 0421239 | 4/1991 | European Pat. Off.. |
| 387655 | 1/1924 | Germany. |
| 1906991 | 9/1969 | Germany. |
| 2802179 | 7/1979 | Germany. |
| 200585 | 1/1939 | Switzerland. |
| 407502 | 8/1966 | Switzerland. |
| 588008 | 5/1977 | Switzerland. |
| 1149029 | 4/1969 | United Kingdom. |

*Primary Examiner*—Michael Safavi
*Attorney, Agent, or Firm*—Shefte, Pinckney & Sawyer

[57] ABSTRACT

A thermally insulating glass panel comprising two spaced-apart sheets of glass enclosing a low pressure space, and interconnected by a peripheral joint of fused solder glass and an array of pillars transversely between the glass sheets. The pillars may be made entirely of metal. Alternatively, the array may be made of a combination of solder glass-containing pillars and non-solder glass-containing pillars. Additional support pieces may be arranged between the glass sheets before the peripheral joint of solder glass is fused.

22 Claims, 11 Drawing Sheets

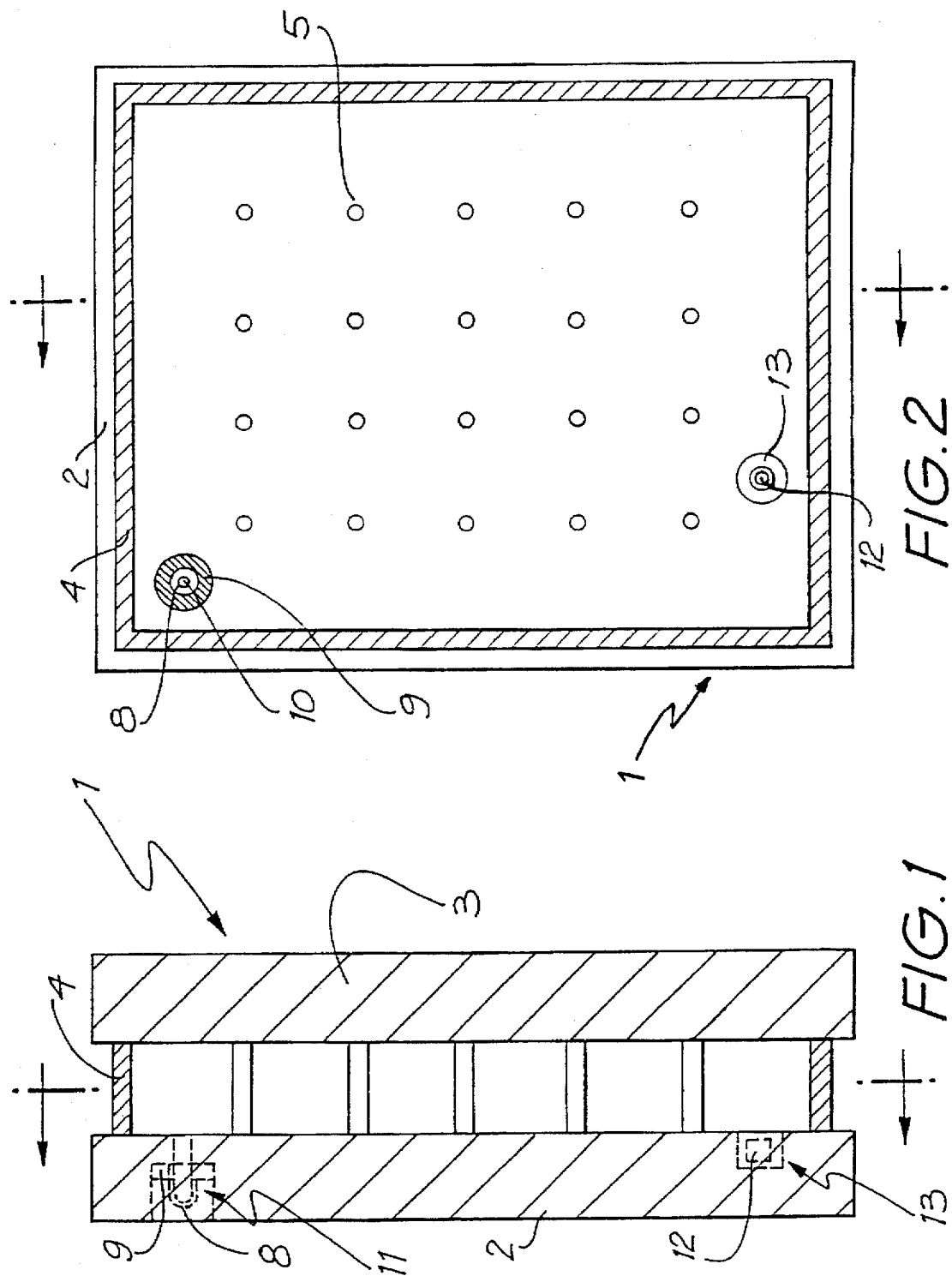

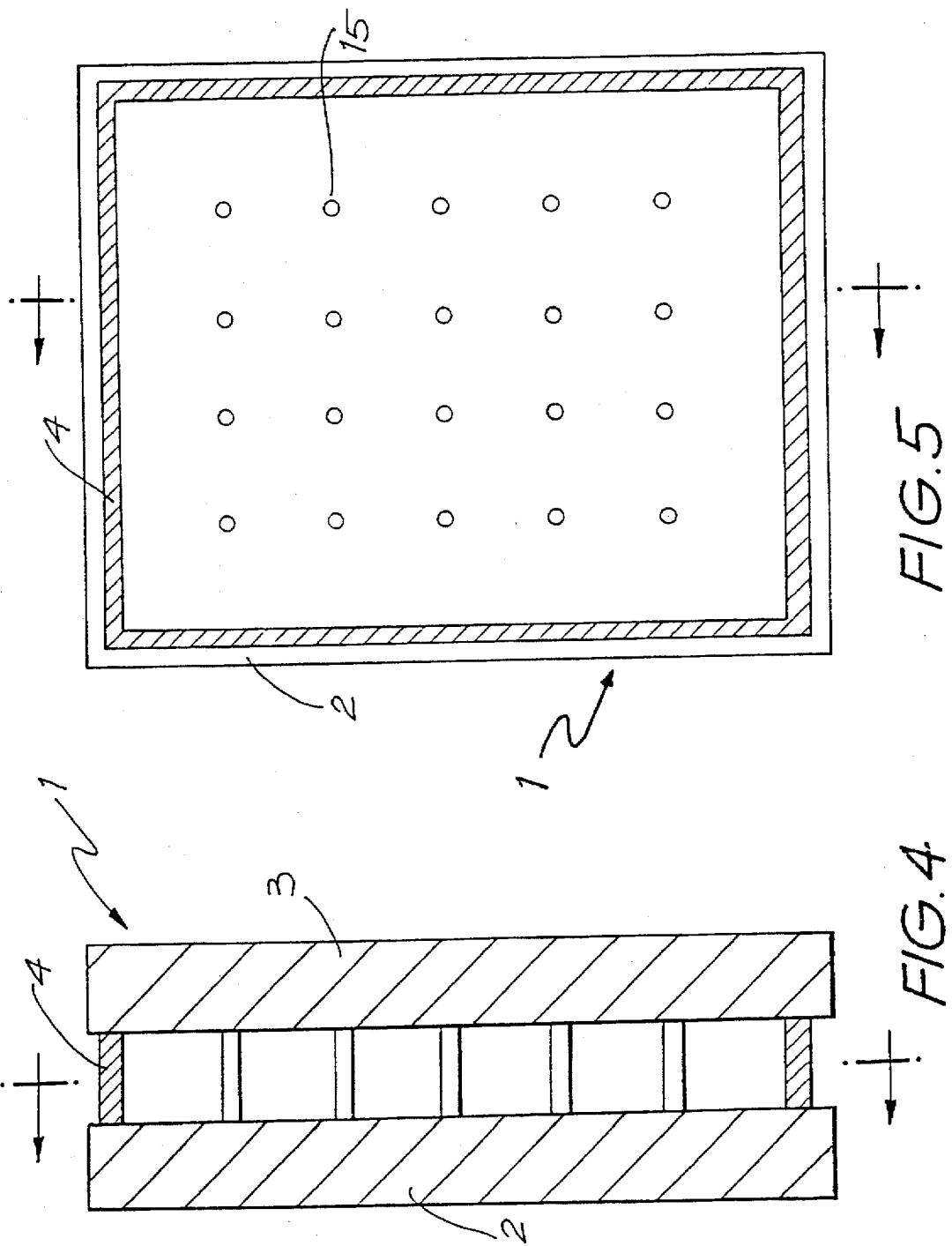

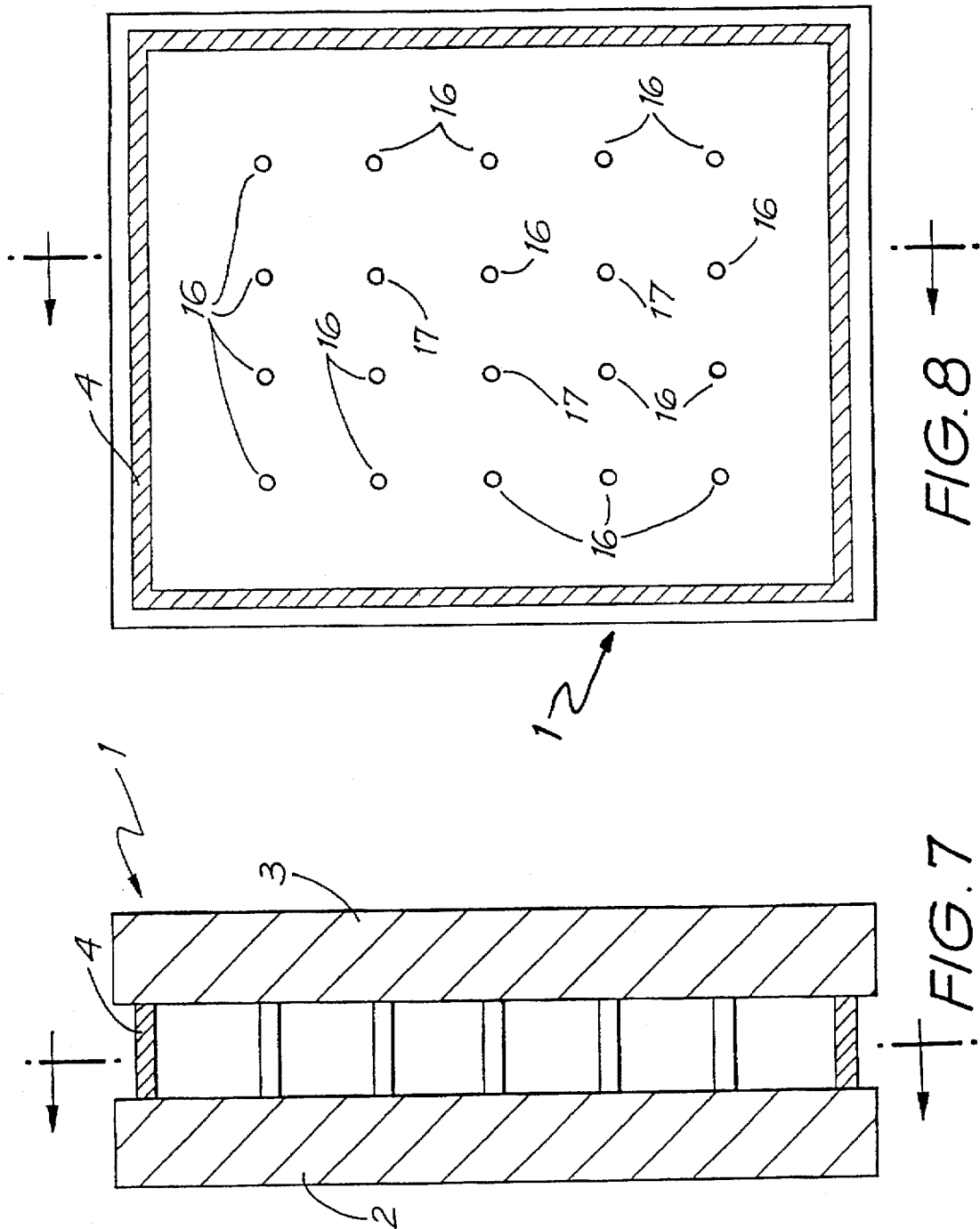

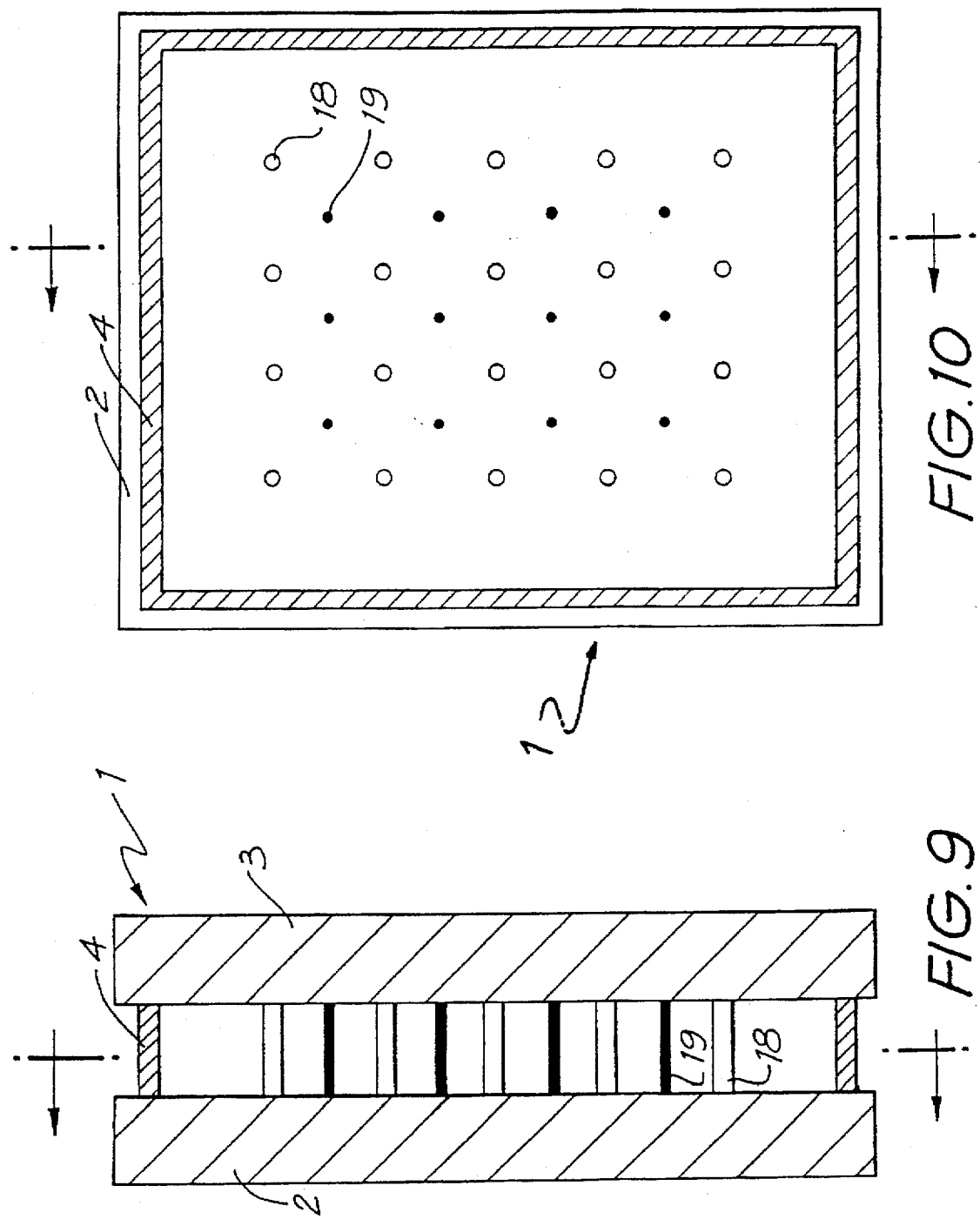

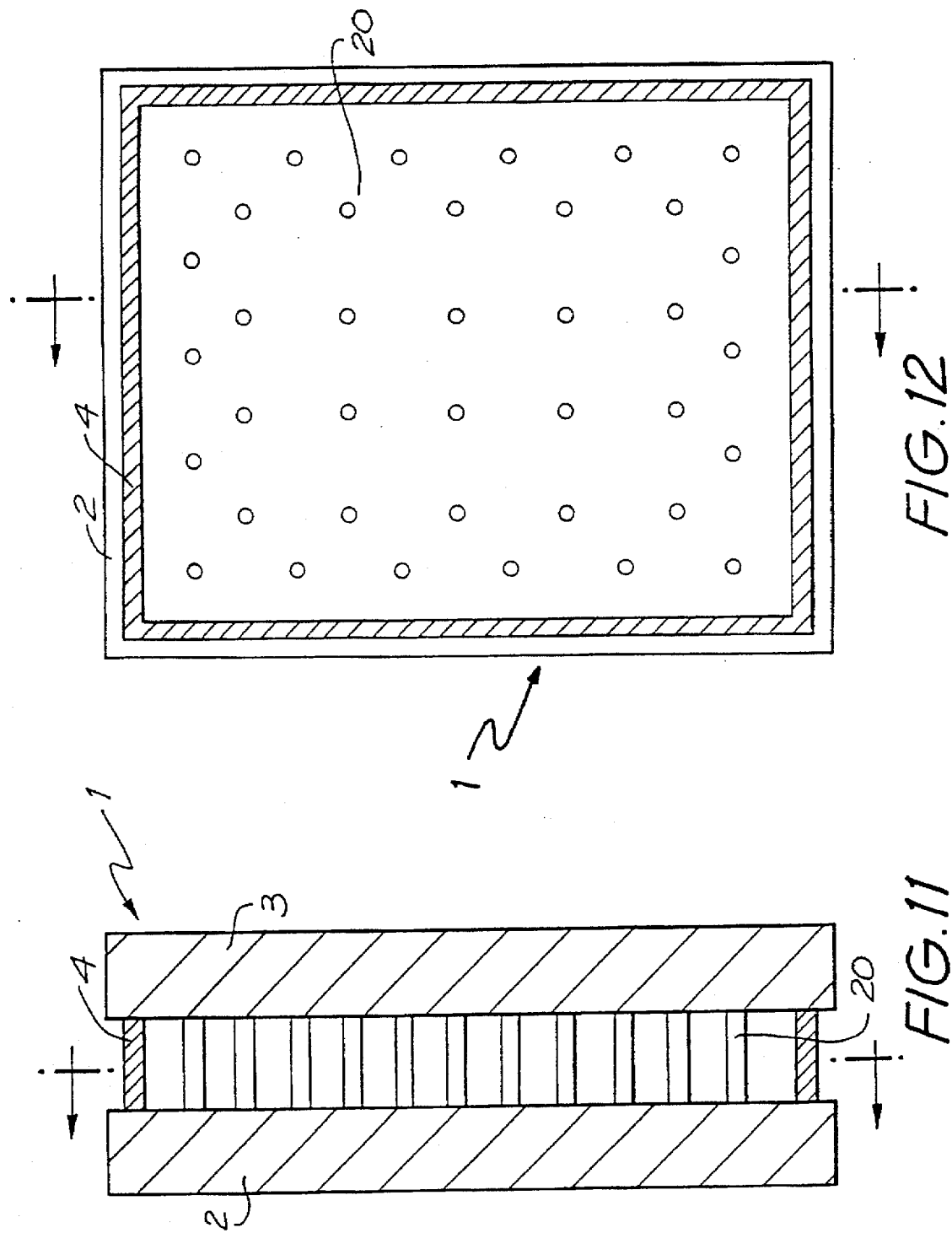

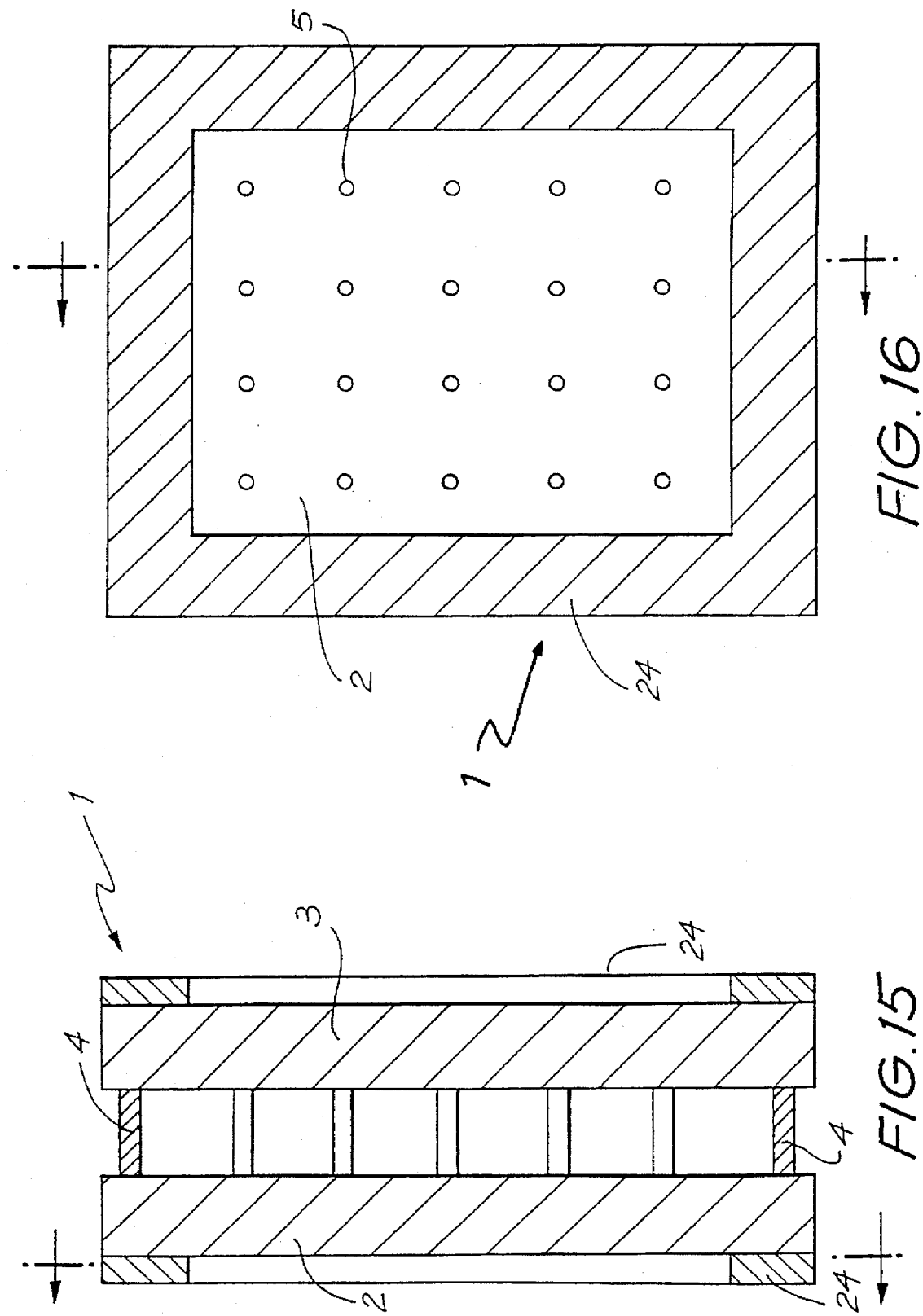

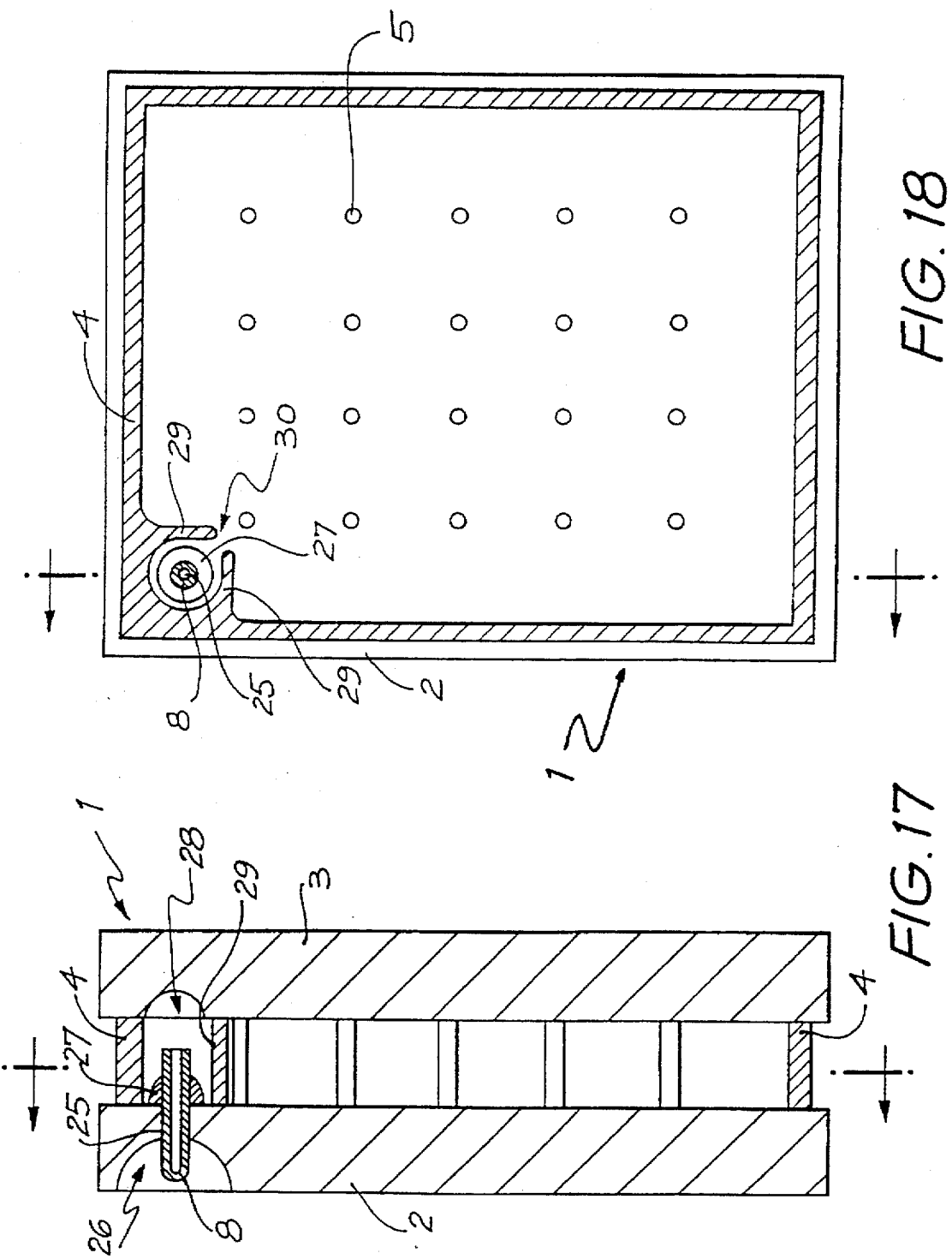

THERMALLY INSULATING GLASS PANELS

TECHNICAL FIELD

This invention concerns improvements to thermally insulating evacuated glass panels; these panels may be used for windows.

BACKGROUND ART

Thermally insulating glass panels 1 typically comprise two spaced apart sheets of glass, 2 and 3, enclosing a low pressure space; refer to FIGS. 1, 2 and 3 (not shown to scale). These sheets are interconnected by a peripheral joint of fused solder glass 4 and an array of pillars 5.

The pillars 5 ensure sufficient structural strength to withstand the forces imposed by atmospheric pressure, and maintain the sheets of glass spaced-apart. The pillars 5 comprise a preform 6 made of glass, ceramic, metal or other materials completely coated with a layer of solder glass 7. The preform 6 is usually made from the same material as the glass sheets in order that the thermal expansion coefficients of the preforms, the sheets and the solder glass should match. The purpose of the preform is to maintain the separation of the glass sheets during the fusion operation when the solder glass has little mechanical strength.

A pump-out tube 8 is incorporated into the panel and is used during the construction of the panel to evacuate the space between the glass sheets. The pump-out tube 8 is hermetically sealed by fused solder glass 9 to a hole 10 which passes from an interior face of glass sheet 2 to the bottom of a recess 11 in the exterior face of glass sheet 2. The recess 11 allows the pump-out tube 8 to be melted and sealed leaving a stub which does not protrude beyond the plane of the exterior face of the glass sheet 2.

A chemical getter 12 is often included within a machined recess 13 in one of the sheets of glass in the panel to counteract any rise in pressure due to outgassing from the glass.

A low emittance coating may be provided on the interior surface of one or both sheets of glass. The emittance of the coatings is usually between 0.05 to 0.2 to ensure a thermal conductance due to radiation of approximately 0.15 to 0.6 $Wm^{-2}K^{-1}$ or less.

The internal pressure of the panel is usually below $10^{-2}$ torr and sometimes below $10^{-3}$ torr.

PILLAR DESIGN

The design of the pillar array is a trade-off between reducing heat flow through the pillars (which imposes a requirement to reduce the number and size of the pillars) and reducing stresses within the panel and pillars (which requires more, and larger pillars).

A first sight, it would appear that the use of metal pillars would result in large heat transfer rates through the panel. Indeed, the thermal conductance of metal pillars is very large, due to the high thermal conductivity of the metal.

In the published literature, it is shown that a short circular contact between two bodies gives rise to a finite thermal impedance, equal to 2 Ka, where K is the thermal conductivity of the bodies and a is the radius of the contact. The existence of this finite thermal impedance arises because of the "spreading resistance" for heat flow within the bodies themselves. The thermal conductance values which apply to glass pillars of zero height also apply to metal pillars, and it has surprisingly been found that the actual heat flow through a metal pillar is quite low; it is almost exactly equal to the thermal conductance of a glass pillar of zero height.

It has therefore been realised that it is possible to design a pillar array using metal pillars, which has adequately low thermal conductance, for which external mechanical stresses are low, and for which internal fracture near the pillars is unlikely to occur.

Accordingly, a first aspect of the present invention, as currently envisaged, provides a thermally insulating glass panel comprising:

two spaced apart sheets of glass enclosing a low pressure space and interconnected by a peripheral joint of fused solder glass and an array of pillars, wherein at least some of the pillars are made entirely of metal.

Preferably the diameter of the metal pillars is 0.2 millimeters or less, for instance 0.1 millimeters. The stress within the panel is affected by the glass thickness, and for 4 mm thick glass sheets the pillar spacing is preferably between 15 and 30 millimeters. A smaller range of between 19 and 23 millimeters is also advantageous. Of course for different glass thicknesses different ranges are possible. The size of pillars and spacing of the array will give a heat flow of less than 0.3 $Wm^{-2}K^{-1}$, and ensure sufficient structural strength to withstand the forces imposed by atmospheric pressure.

Preferably some, limited, inelastic deformation of the metal pillars occurs during construction of the panel. This will accommodate planar irregularities between the two glass sheets ensuring good physical contact between the pillars and the glass sheets.

Preferably the metal pillars are nickel, iron, molybdenum, tungsten, tantalum, titanium, aluminium, steel or stainless alloys containing these metals. These metals ensure thermal performance and structural strength for the preferred pillar sizing and array geometry.

An embodiment of this aspect of the invention will now be described with reference to FIGS. 4, 5 and 6.

Panel 1 comprises two spaced apart glass sheets 2 and 3. The sheets are interconnected by a peripheral joint 4 of fused solder glass, and by an array of pillars 15.

Values of pillar separation and pillar radius, which achieve low external stresses, low probability of internal fracture near the pillars, and a heat flow for the entire pillar array less than 0.3 $Wm^{-2}K^{-1}$, are shown in FIG. 6. Typical values for the dimensions of an array of metal pillars are:

Pillar separation: 23 mm

Pillar diameter: 0.2 mm

There is considerable flexibility in the choice of materials for the metal pillars disclosed here. The pillars must be strong enough to resist the compressive forces due to atmospheric forces. It is noted, however, that some limited inelastic deformation of the pillars when the vacuum is initially applied is tolerable and, indeed, may be advantageous. Such deformation compensates for minor variations in planarity of the glass sheets, and results in good mechanical contact between the pillar and the glass, thus evenly distributing the load over the pillar surface.

The material of the pillars should be compatible with the high temperature processing of the window ($\approx 500°$ C. for 1 hour) and must have a low vapour pressure in order not to degrade the vacuum.

Suitable metals which satisfy these design constraints include: nickel, iron, molybdenum, tungsten, tantalum, titanium, aluminium and alloys containing these materials, such as steel, and stainless steel.

BRIEF DESCRIPTION OF THE DRAWINGS

FIG. 1 illustrates a side view of a typical thermally insulating glass panel;

FIG. 2 is a plan view of a typical thermally insulating glass panel;

FIG. 4 illustrates a side view of one embodiment of the thermally insulating glass panel of the present invention;

FIG. 5 illustrates a plan view of the embodiment of the thermally insulating glass panel of the present invention of FIG. 4;

FIG. 7 illustrates a side view of another embodiment of the present invention;

FIG. 8 illustrates a plan view of the embodiment of the present invention of FIG. 7;

FIG. 9 illustrates a side view of another embodiment of the present invention;

FIG. 10 illustrates a plan view of the embodiment of the present invention illustrated in FIG. 9;

FIG. 11 is a side view of another embodiment of the present invention in which the density of the pillars is varied;

FIG. 12 is a plan view of the embodiment of the present invention illustrated in FIG. 11;

FIG. 15 is a side view of another embodiment of the present invention illustrating an increase in the thickness of the edges of the glass panel;

FIG. 16 is a plan view of the embodiment of the present invention illustrated in FIG. 15;

FIG. 17 is side view of another embodiment of the present invention illustrating the glass tube;

FIG. 18 is a plan view of the embodiment of the present invention illustrated in FIG. 17;

CONTROL OF SEPARATION OF GLASS SHEETS

Figure 3:
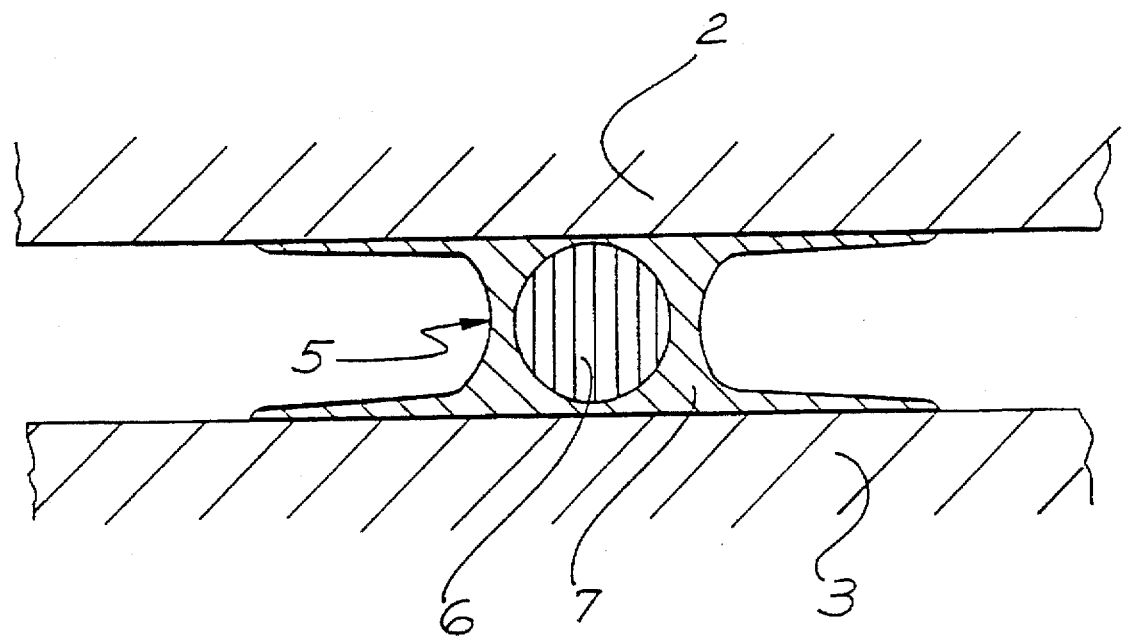
FIG. 3 is a cross-section of a pillar in a typical thermally insulating glass panel.
Figure 6:
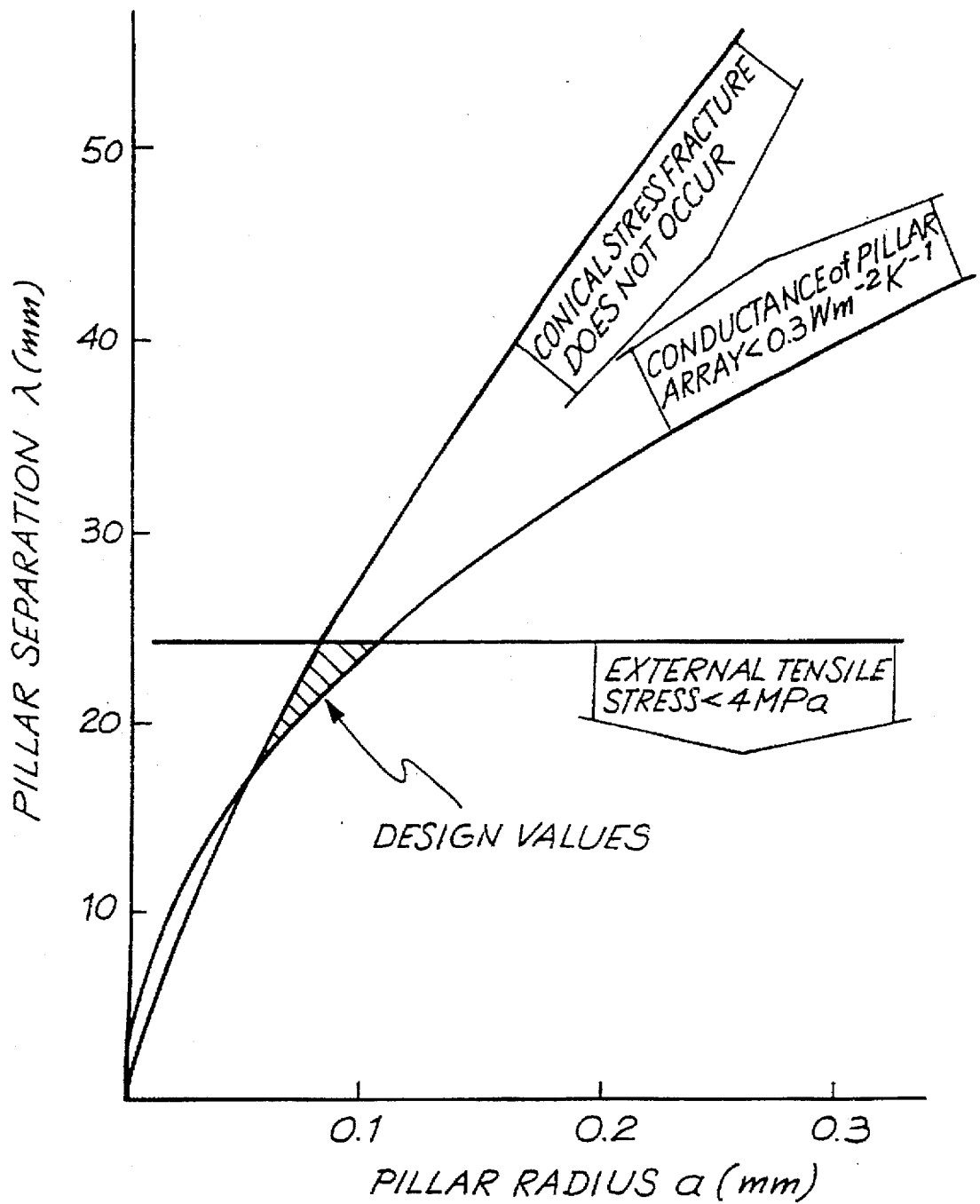
FIG. 6 graphs the values of pillar separation against pillar radius against the conductance of pillar array being less than 0.3 $Wm^{-2}K^{-1}$ and external tensile stress being less than 4 MPa.

The separation of the glass sheets must be maintained when the solder glass is fused.

Hybrid Pillar Array

According to another aspect of the present invention, as currently envisaged, there is provided a thermally insulating glass panel comprising:

two spaced apart sheets of glass enclosing a low pressure space and interconnected by a peripheral joint of fused solder glass and an array of pillars; wherein the array of pillars is made up of a combination of solder glass containing pillars and non-solder glass containing pillars.

Advantageously the solder glass containing pillars have an expansion coefficient matched to the sheets of glass.

preferably the non-solder glass containing pillars contain glass, ceramic or metal materials. The non-solder glass containing pillars maintain the spacing between the two glass sheets when the solder glass is melted.

An embodiment of this aspect of the invention will now be described with reference to FIGS. 7 and 8.

Panel 1 comprises two spaced apart glass sheets 2 and 3. The sheets are interconnected by a peripheral joint 4 of fused solder glass, and by an array of pillars. Some pillars 16 contain solder glass, but a small proportion of pillars 17 do not contain solder glass, and do not melt when the solder glass is fused.

The non-solder glass containing pillars 17 maintain the separation between the glass sheets during solder glass fusion. All the pillars 16 and 17 maintain the separation between the glass sheets after solder glass fusion when the panel has been evacuated and is subject to atmospheric pressures.

Metal is a preferred material for the non-solder glass containing pillars. However, metal pillars exhibit larger heat flow than solder glass pillars of comparable diameter, but the increase in total heat flow through the array is relatively small if the fraction of metal pillars is not large.

Solder Glass Pillar Array

As an alternative, according to this aspect of the present invention, as currently envisaged, there is provided a thermally insulating glass panel comprising:

two spaced apart sheets of glass enclosing a low pressure space and interconnected by a peripheral joint of fused solder glass and an array of solder glass containing pillars; wherein support pieces are arranged between the glass sheets before the peripheral joint of solder glass is fused to maintain the spacing between the two glass sheets during solder glass fusion.

Preferably the support pieces break up when the low pressure space is subsequently created after the solder glass fusion. The break up of the support pieces prevents subsequent heat conduction through them, leading to an overall better thermal performance of the glass panel.

The support pieces may be made of glass, ceramic or metal materials.

An embodiment of this aspect of the invention will now be described with reference to FIGS. 9 and 10.

Referring now to FIGS. 9 and 10, panel 1 comprises two spaced apart glass sheets 2 and 3. The sheets are interconnected by a peripheral joint 4 of fused solder glass, and by an array of solder glass containing pillars 18. In addition support pieces 19 are used during the fabrication of the panel 1.

The support pieces 19 are made from glass, ceramic or metal materials. They may have one or more of several geometric forms, including spheres, rods, or hollow tubes.

The supports must be sufficiently strong to support the glass sheets when the solder glass is in its melted state. However, they do not need to be strong enough to support the load due to the vacuum as this may be totally borne by the normal support pillars. In the case the supports break when the vacuum is applied. The pieces will then fall to the bottom of the panel and play no further part.

A METHOD OF CONSTRUCTING A THERMALLY INSULATING GLASS PANEL

Also according to this aspect of the present invention, as currently envisaged, there is provided a method of constructing a thermally insulating glass panel comprising two spaced apart sheets of glass enclosing a low pressure space interconnected by a peripheral joint of fused solder glass and an array of pillars, the method including the steps of:

(a) depositing a strip of solder glass around the periphery of the sheets;

(b) depositing an array of pillars onto one of the sheets of glass;

(c) arranging support pieces between the sheets of glass; then (d) bringing the glass sheets together, or permitting them to move together until the sheets come into contact with the support pieces;

(e) heating the panel to melt the solder glass; and (f) creating a low pressure space between the glass sheets.

The support pieces maintain the spacing between the two glass sheets when solder glass is fused, but may break up under the load of forces resulting from atmospheric pressure when the low pressure space is created.

REDUCTION OF STRESS IN THE PANEL

The mechanical stresses in evacuated panels are quite complex, and arise from several different sources.

Atmospheric pressure produces large stresses in the support pillars, and in the glass sheets immediately adjacent to the pillars. The nature of these stresses is well understood in the context of Hertzian indenter fracture experiments. Atmospheric pressure also results in tensile stresses on the outside surfaces of the glass sheets, near the pillars.

The existence of temperature differences across the panel gives rise to significant bending stresses and shear stresses in the solder glass joint. Also, thermal short circuiting by the peripheral solder glass joint affects the stresses in the region of the edge.

Wind loading of the panel also produces external tensile stresses.

In the design of evacuated panels it is important to consider the resultant stress, since it is this which acts to cause fracture. It has been found that the mechanical stresses due to bending are greatest near the edges of the panel. This arises because of the complex way in which the tensile and compressive stresses in the glass sheets translate into shear stresses in the fused solder glass joint, and because the temperature differences across the glass sheets near the edges are different from those near the middle of the panel. All these factors cause stress in the panel to be more severe near the edges, and the corners, than over the rest of the surface.

Three advantageous techniques for combating stress will now be explored:

Pillar Density

The density of pillars may be greater throughout some regions of the panel than others; in particular near the edges.

An embodiment will now be described with reference to FIGS. 11 and 12.

Panel 1 comprises two spaced apart glass sheets 2 and 3. The sheets are interconnected by a peripheral joint 4 of fused solder glass, and by an unevenly distributed array of pillars 20.

The pillar array is arranged such that the density of pillars 20 near the peripheral fused solder glass joint of the panel 1 is greater than towards the centre of the panel 1. This provides additional structural support in the regions of the panel subject to greater resultant stress. The tensile stresses near the edge of the panel are reduced significantly by increasing the density of support pillars near the edge. This occurs because the level of tensile stress above each support pillar in the edge region is reduced, with a consequent reduction in the total tensile stress.

Reductions in stresses near the edges can also be achieved by incorporating into the device, near the edges, pillars which are less compliant than the majority of the pillars in the array. Less compliant pillars can be of the same material as that of the rest of the array and of larger area, or of a different, less compliant material. The effect of including such pillars is to increase the area of the window over which bending deformation due to atmospheric pressure occurs, and to decrease the magnitude of the tensile stresses associated with such deformation.

It is recognised, of course, that increased heat transfer occurs because of the greater number, or larger size, of support pillars. However, the increase is relatively small in terms of the overall insulating performance of the structure, and is more than outweighed by the beneficial effects from the reduced stresses.

Pre-Stressing

The panel may be prestressed before the solder glass is fused. For instance compressive stress built into the panel reduces the effect of external tensile stress.

Figure 14:
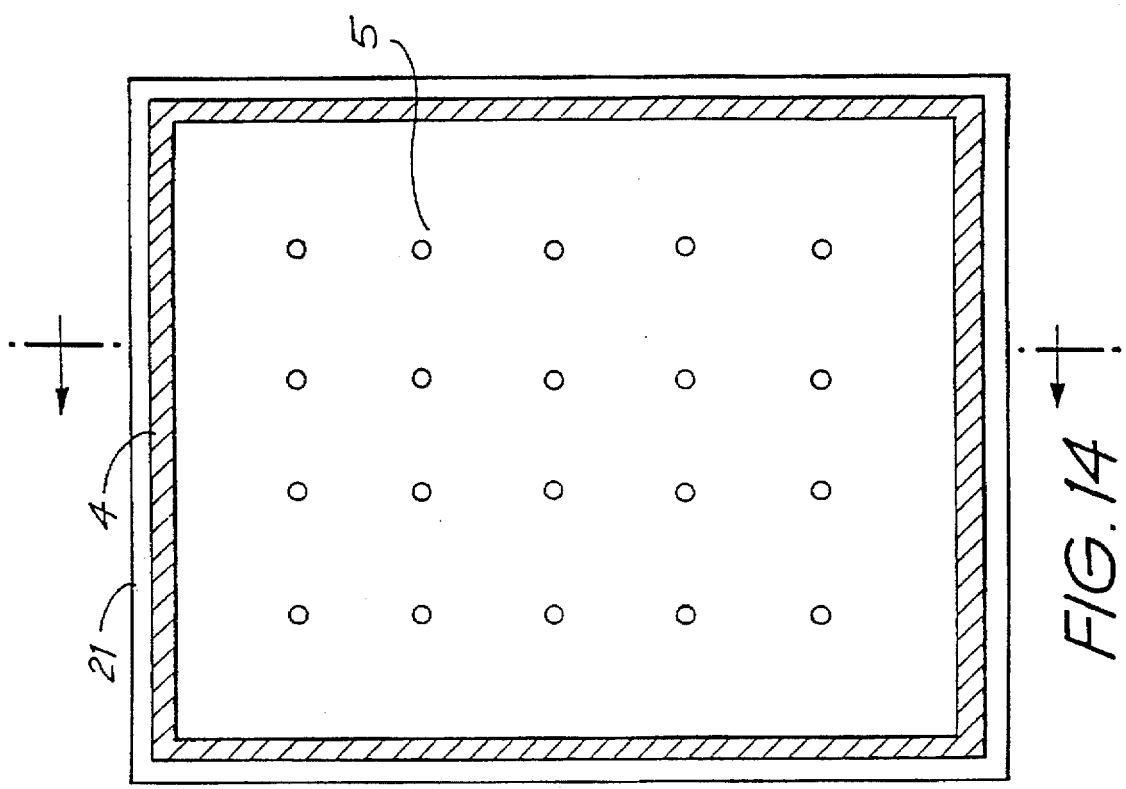
FIG. 14 is a plan view of the embodiment of the present invention illustrated in FIG. 13.
Figure 13:
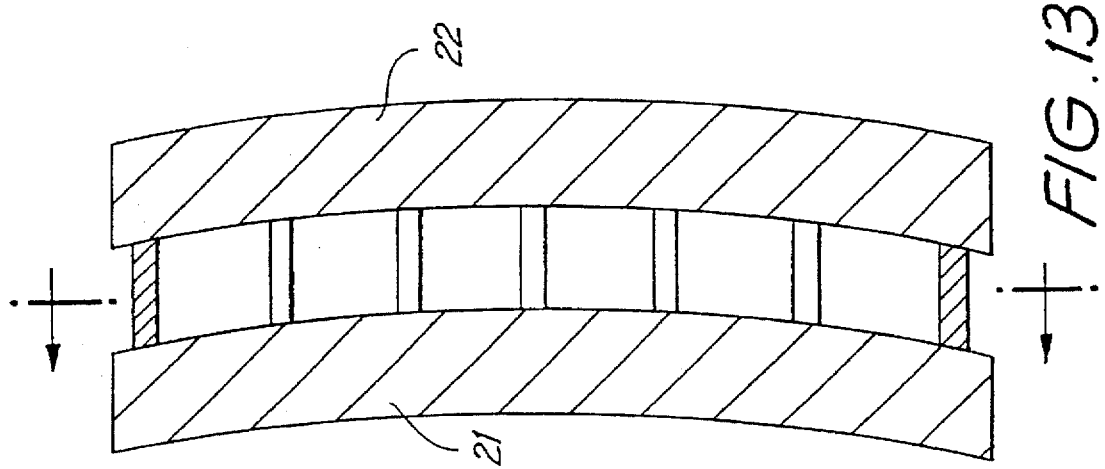
FIG. 13 is a side view of another embodiment of the present invention illustrating prestressing of the glass panels.

An embodiment will now be described with reference to FIGS. 13 and 14.

Panel 1 comprises two spaced apart glass sheets 21 and 22. The sheets are interconnected by a peripheral joint 4 of fused solder glass, and by array of pillars 5.

Tensile stress can be reduced by establishing compressive stress, during manufacture, in that region of the panel when tensile stress will subsequently occur.

For example, if the glass sheet 21 will ultimately be installed on the outside of a building in a cold climate, the panel is bent throughout the fusion operation to provide a concave shape on the exterior surface of sheet 21. The magnitude of the pretensioning should not be such as to cause serious stresses in the panel. For example, for stresses less than 4 MPa, the probability of failure of the panel is negligible. When a prestressed window is installed, the compressive stress on the outside serves as an offset which increases the ability of the device to withstand temperature differences whilst maintaining external stresses below specified levels.

Stiffening the Edges

The edge regions of at least one sheet of glass may be thickened. The thickness of the sheets of glass may be increased around the edges of the glass panel by fixing, with adhesive, a plate to one or both sides of the edge region of at least one of the glass sheets.

The bending stiffness of a beam is a function of its thickness, varying inversely with the cube of the thickness. A relatively small increase in the thickness of the edges of the panel therefore results in significant stiffening of the structure as a whole. This stiffening can be used to reduce the overall bending of the device to the point where the external stresses on the hot side are very small. In addition, the existence of the bonded edge significantly reduces the tensile stresses in the glass sheets near the edge.

An embodiment will now be described with reference to FIGS. 15 and 16.

Panel 1 comprises two spaced apart glass sheets 2 and 3. The sheets are interconnected by a peripheral joint 4 of fused solder glass, and by array of pillars 23.

The thickness of the edge of the panel 1 is increased by bonding plates 24, with adhesive, to the external faces of both glass sheets. This reduces tensile stresses in the glass sheets near the edge, and reduces the resultant shear stress in the peripheral fused glass joint 4.

PUMP-OUT TUBE

The design of the pump-out tube imposes particular challenges. Ideally, the tube should be very small, and located entirely within the nominal geometric dimensions of the evacuated window structure. However, small glass tubes can be extremely fragile and it is very difficult to seal mechanically to such tubes during evacuation without breaking them.

According to a further aspect of the present invention, as currently envisaged, there is provided a thermally insulating glass panel comprising two spaced apart sheets of glass enclosing a low pressure space interconnected by a peripheral joint of fused solder glass and an array of pillars, and a pump-out tube to provide communication between the interior and the exterior of the panel during the creation of the low pressure space; wherein the pump-out tube extends through a hole extending from the bottom of a recess in the exterior face of one sheet of glass to the interior face of that sheet of glass, and the tube is joined to that sheet of glass by a solder glass joint made between the outside surface of the pump-out tube and the interior face of that sheet of glass.

The solder glass seal between the pump-out tube and the polished internal surface of the sheet of glass, is more effective than a seal to an abraded surface such as in the bottom of the recess. This is because the abraded glass surface contains many microcracks which extend some distance into the body of the glass. The solder glass may not completely close all these microcracks and very slow leaks can occur due to lateral motion of gas through the poorly connected microcrack region. By fusing the solder glass onto the smooth interior surface of the glass plates, this problem does not arise.

In addition the solder glass forms a smooth surface on the vacuum side, and is easily evacuated.

It will be appreciated that if the fused seal between the solder glass and the glass sheet is made on the inside of the glass plate, then the end of the pump-out tube and the solder glass seal protrudes into the gap of the evacuated window. Since this gap is normally very small, there is a danger that the protrusion will contact onto the surface of the other glass sheet. In order to avoid this, a second recess may be machined onto the interior face of the other glass sheet in registration with the hole, to permit the extension of the pump-out tube to remain out of contact.

Preferably there is a fused solder glass joint between the two glass sheets extending partly around the hole. This provides local structural reinforcement around the pump-out hole and the recess.

An embodiment of this aspect of the invention will now be described with reference to FIGS. 17 and 18.

Panel 1 comprises two spaced apart glass sheets 2 and 3. The sheets are interconnected by a peripheral joint 4 of fused solder glass, and by array of pillars 5.

The pump-out tube 8 is positioned in a hole 25 drilled from the bottom of a machined recess 26 in the exterior face of one sheet of glass 2 to the interior face of that sheet of glass 2. The pump-out tube 8 is joined to that sheet of glass by an hermetic solder glass joint 27 made between the outside surface of the pump-out tube 8 and the interior face of sheet 2. A machined recess 28 in glass sheet 3, in registration with the pump-out tube hole, 25 provides clearance between the pump-out tube 8 and glass sheet 3.

The hole for the pump-out tube and the recesses give rise to stress magnification. In particular, under temperature differentials, or due to the effects of atmospheric pressure, the tensile stresses that are inevitably present in the glass are larger in the immediate vicinity of these features. In order to reduce the effect of this stress concentration the solder glass deposited on the periphery of the glass sheets, which forms the fused solder glass joint 4, may be extended 29 to partly surround the pump-out tube 8 and the recess 28. A small gap 30 is left in the solder glass seal to permit the evacuation to take place. After fusion, solder glass 29 provides structural support around the pump-out tube 8. The existence of this solder glass around the pump-out tube results in almost complete elimination of mechanical tensile stresses due to bending or atmospheric pressure and has a highly advantageous effect in the reduction of the probability of failure due to stress magnification by the pump-out tube recess.

After the space in the interior of the panel has been evacuated, the part of the tube 8 inside recess 26 is heated until it melts and is then sealed (tipped-off). It can be seen, in FIG. 17, that the tube 8 when tipped off does not protrude beyond the surface of glass sheet 2. The reason for this is so that when the panel is framed tube 8 will not be damaged by the frame, and is protected by the frame. The stub of the pump-out tube may be encapsulated or otherwise protected prior to mounting in the frame, in order to facilitate handling without damage.

Figure 19:
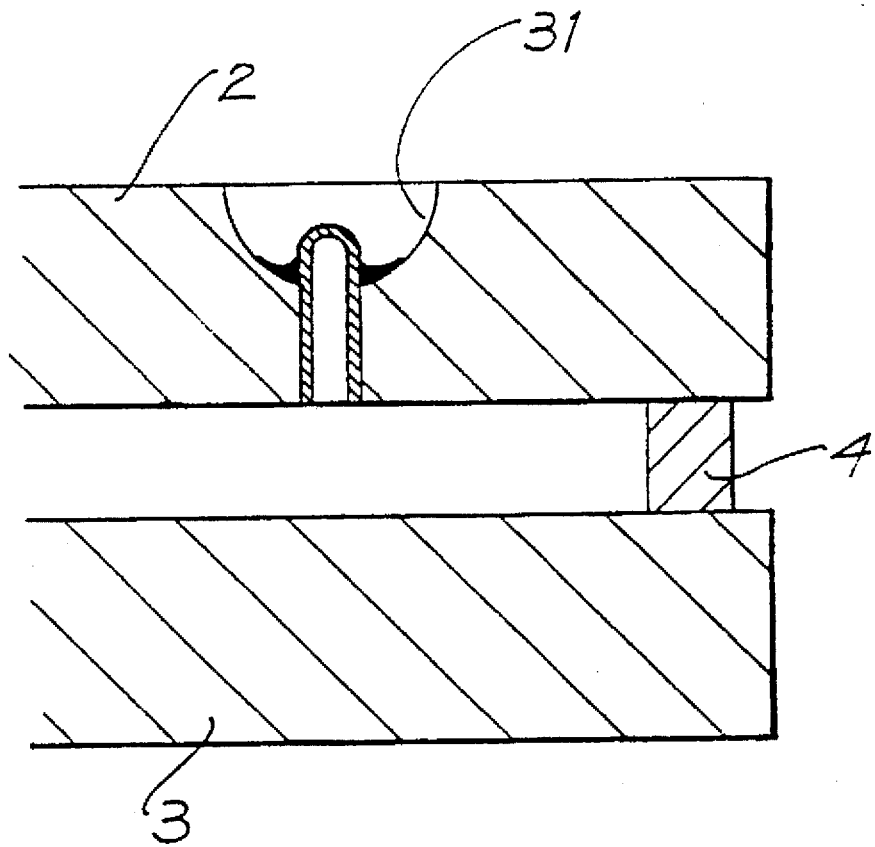
FIG. 19 is a side view illustrating another embodiment of the present invention.

A variant of the technique for sealing the pump-out tube, is to polish the inside of the recess in which the end of the pump-out tube is located. The polished surface 31 of the recess is suitable for the solder glass sealing operation, being smooth. In this case, a satisfactory seal can be made on the exterior surface of the glass, as shown in FIG. 19.

We claim:

1. A thermally insulating glass panel comprising:
   two spaced apart sheets of glass enclosing a low pressure space and interconnected by a peripheral joint of fused solder glass and an array of pillars;
   wherein at least some of the pillars are made entirely of metal, and pillar spacing, pillar radius and the number of pillars are chosen such that tensile stress present on outward facing surfaces of the glass sheets is smaller than about 4 MPa, conical stress fracture of the sheets of glass adjacent pillar locations is deterred, and heat flow for the entire pillar array is less than 0.3 $Wm^{-2}K^{-1}$.

2. A panel according to claim 1 wherein the glass sheets are four millimeters thick, the pillar diameters range from 0.1 to 0.2 millimeters, and the pillars spacings range from 15 to 30 millimeters.

3. A panel according to claim 1, wherein the metal pillars are capable of inelastic deformation during construction of panel.

4. A panel according to claim 1, wherein the metal is selected from the group consisting of nickel, iron, molybdenum, tungsten, tantalum, titanium, aluminum, steel and a stainless alloy, the alloy comprising at least one metal selected from the group consisting of nickel, iron, molybdenum, tungsten, tantalum, titanium, aluminum and steel.

5. A panel according to claim 1, wherein the density of pillars is greater throughout some regions of the panel than others.

6. A thermally insulating glass panel comprising:
   two spaced-apart sheets of glass enclosing a low pressure space and interconnected by a peripheral joint of fused solder glass and an array of pillars;

wherein at least some of the pillars are made entirely of metal; and wherein the pillars are less compliant in some regions of the panel than others.

7. A thermally insulating glass panel comprising:

two spaced-apart sheets of glass enclosing a low pressure space and interconnected by a peripheral joint of fused solder glass and an array of pillars;

wherein at least some of the pillars are made entirely of metal; and wherein the panel is manufactured to be in a prestressed state for installation such that predetermined regions on one outside face of the panel are subject to tensile stress and predetermined regions on an opposite outside face of the panel are subject to compressive stress.

8. A thermally insulating glass panel, comprising:

two spaced apart sheets of glass enclosing a low pressure space and interconnected by a peripheral joint of fused solder glass an array of pillars, and a pump-out tube to provide communication between the interior and the exterior of the panel during the creation of the low pressure space;

wherein a pump-out tube extends through a hole extending from the bottom of a recess in the exterior face of one sheet of glass to the interior face of that sheet of glass, and the tube is joined to that sheet of glass by a solder glass joint made between the outside surface of the pump-out tube and the interior face of that sheet of glass.

9. A panel according to claim 8, wherein a recess is provided on the interior face of the other sheet of glass in registration with the hole.

10. A panel according to claim 8, wherein there is a fused solder glass joint between the two glass sheets, which extends partly around the hole.

11. A thermally insulating glass panel comprising:

two spaced-apart sheets of glass enclosing a low pressure space and interconnected by a peripheral joint of fused solder glass and an array of pillars;

wherein at least some of the pillars are made entirely of metal;

wherein the density of pillars is greater throughout some regions of the panel than others; and wherein the number of pillars per unit area of the glass sheets in an area adjacent the peripheral joint of fused solder glass is greater than the number of pillars per unit area of the glass sheets in an area adjacent a center region of the panel.

12. A method of constructing a thermally insulating glass panel comprising two spaced apart sheets of glass enclosing a low pressure space interconnected by a peripheral joint of fused solder glass and an array of pillars, the method including the steps of:

(a) depositing a strip of solder glass around the periphery of the glass sheets;

(b) depositing an array of pillars onto one of the sheets of glass;

(c) arranging support pieces between the sheets of glass; then (d) bringing the glass sheets together, or permitting them to move until the sheets come into contact with the support pieces;

(e) heating the panel to melt the solder glass; and (f) creating a low pressure space between the glass sheets;

wherein the support pieces maintain the spacing between the two sheets of glass when the solder glass is fused but break up when the low pressure space is created.

13. A method according to claim 12, wherein the support pieces are made from materials selected from the group consisting of glass, ceramic and metal materials.

14. A method according to claim 12, wherein the array of pillars is arranged such that the number of pillars per unit area of the glass sheets in an area adjacent the peripheral joint of fused solder glass is greater than the number of pillars per unit area of the glass sheets in an area adjacent a center region of the panel.

15. A thermally insulated glass panel manufactured in accordance with the method of claim 12.

16. A method of constructing a thermally insulating glass panel comprising two spaced apart sheets of glass enclosing a low pressure space interconnected by a peripheral joint of fused solder glass and an array of pillars, the method including the steps of:

(a) depositing a strip of solder glass around the periphery of at least one of the glass sheets;

(b) depositing an array of pillars onto at least one of the sheets of glass;

(c) bringing the glass sheets together in spaced mirror relation until the array of pillars is contacted with both glass sheets;

(d) heating the panel to melt the solder glass to create the peripheral joint;

(e) deforming the panel to induce pre-stressing in a predetermined region of at least one of the sheets of glass; and (f) creating a low pressure space between the glass sheets.

17. The method according to claim 16, wherein the deforming of the panel is performed during the heating step to impose a concave shape on an exterior face of one of the sheets.

18. The method according to claim 17, wherein the deforming of the panel is performed to induce a stress in the predetermined region of less than 4 MPa.

19. The method according to claim 16, wherein the deforming of the panel is accomplished during the step of heating the panel.

20. The method according to claim 16, wherein the deforming of the panel induces tensile pre-stressing in a predetermined region of at least one of the sheets of glass.

21. The method according to claim 16, wherein the deforming of the panel induces compressive pre-stressing in a predetermined region of at least one of the sheets of glass.

22. A thermally insulated glass panel manufactured in accordance with the method of claim 16.

* * * * *